United States Patent
Bosworth

(10) Patent No.: US 10,820,060 B1
(45) Date of Patent: Oct. 27, 2020

(54) ASYNCHRONOUS CO-WATCHING

(71) Applicant: Facebook, Inc., Menlo Park, CA (US)

(72) Inventor: Andrew Garrod Bosworth, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/020,549

(22) Filed: Jun. 27, 2018

(51) Int. Cl.
*G06F 3/048* (2013.01)
*H04N 21/478* (2011.01)
*G06K 9/00* (2006.01)
*H04N 5/76* (2006.01)
*H04N 21/442* (2011.01)
*H04N 5/45* (2011.01)
*G06N 20/00* (2019.01)

(52) U.S. Cl.
CPC ....... *H04N 21/478* (2013.01); *G06K 9/00302* (2013.01); *G06K 9/00335* (2013.01); *H04N 5/45* (2013.01); *H04N 5/76* (2013.01); *H04N 21/44218* (2013.01); *G06N 20/00* (2019.01)

(58) Field of Classification Search
CPC .. G06Q 10/10; G06Q 10/107; H04L 65/4038; H04N 7/15; H04M 3/56
See application file for complete search history.

(56) References Cited

U.S. PATENT DOCUMENTS

| | | | | |
|---|---|---|---|---|
| 7,606,444 B1* | 10/2009 | Erol | ................... | G06K 9/00711 382/305 |
| 9,998,796 B1* | 6/2018 | Kedenburg, III | .... | H04N 21/482 |
| 10,390,097 B1* | 8/2019 | Lee | ..................... | H04N 21/4882 |
| 2007/0040898 A1* | 2/2007 | Lee | ......................... | H04N 7/147 348/14.08 |
| 2007/0100939 A1* | 5/2007 | Bagley | ................... | G06Q 10/10 709/204 |
| 2011/0029893 A1* | 2/2011 | Roberts | .................. | G06Q 10/10 715/753 |
| 2011/0161834 A1* | 6/2011 | Shadfar | ............... | H04L 65/4038 715/753 |
| 2011/0295392 A1* | 12/2011 | Cunnington | ........... | G06Q 10/10 700/90 |
| 2013/0138749 A1* | 5/2013 | Bohm | ..................... | H04L 51/32 709/206 |

(Continued)

OTHER PUBLICATIONS

International Search Report and Written Opinion received for PCT Application Serial No. PCT/IB2019/056852 dated Oct. 2, 2019, 10 pages.

*Primary Examiner* — Rashawn N Tillery
(74) *Attorney, Agent, or Firm* — FisherBroyles, LLP

(57) ABSTRACT

The disclosed computer-implemented method may include determining that a subsequent user is consuming content that was consumed previously by an initial user. The computer may access various reactions by the initial user to the content that were recorded and synchronized as the initial user consumed the content. The computer may further determine that at least some of the reactions by the initial user have an engagement level above a predetermined threshold, and then provide the reactions with engagement levels above the predetermined threshold for presentation to the subsequent user synchronously with the content as the content is consumed by the subsequent user. Various other methods, systems, and computer-readable media are also disclosed.

20 Claims, 9 Drawing Sheets

(56) References Cited

U.S. PATENT DOCUMENTS

| | | | |
|---|---|---|---|
| 2013/0304820 A1* | 11/2013 | Vasquez | H04L 67/00 709/204 |
| 2014/0026201 A1 | 1/2014 | Srinivasan et al. | |
| 2014/0032265 A1* | 1/2014 | Paprocki | G06Q 30/0201 705/7.29 |
| 2014/0233907 A1* | 8/2014 | Anderson | H04N 5/44513 386/225 |
| 2015/0347903 A1* | 12/2015 | Saxena | G06T 11/206 706/11 |
| 2016/0034111 A1* | 2/2016 | Sahai | G06Q 10/10 715/730 |
| 2016/0042648 A1* | 2/2016 | Kothuri | G06F 3/015 434/236 |
| 2016/0261655 A1* | 9/2016 | Aggarwal | H04L 65/4053 |
| 2016/0366203 A1* | 12/2016 | Blong | H04L 51/32 |
| 2017/0034237 A1* | 2/2017 | Silver | H04L 65/604 |
| 2017/0262762 A1* | 9/2017 | Conover | G06Q 50/01 |
| 2019/0392266 A1* | 12/2019 | Zhong | H04L 65/607 |

\* cited by examiner

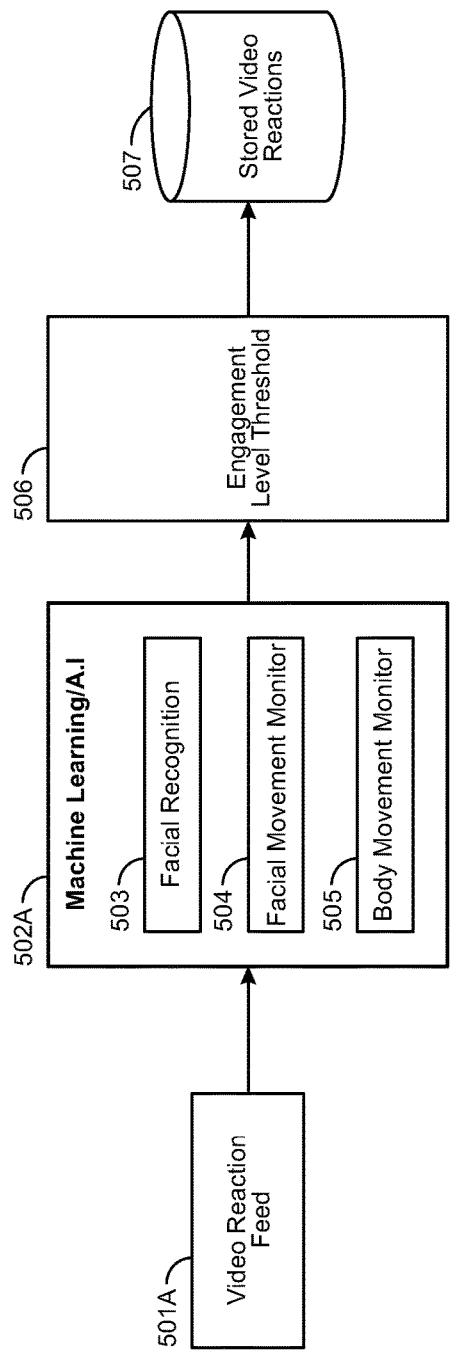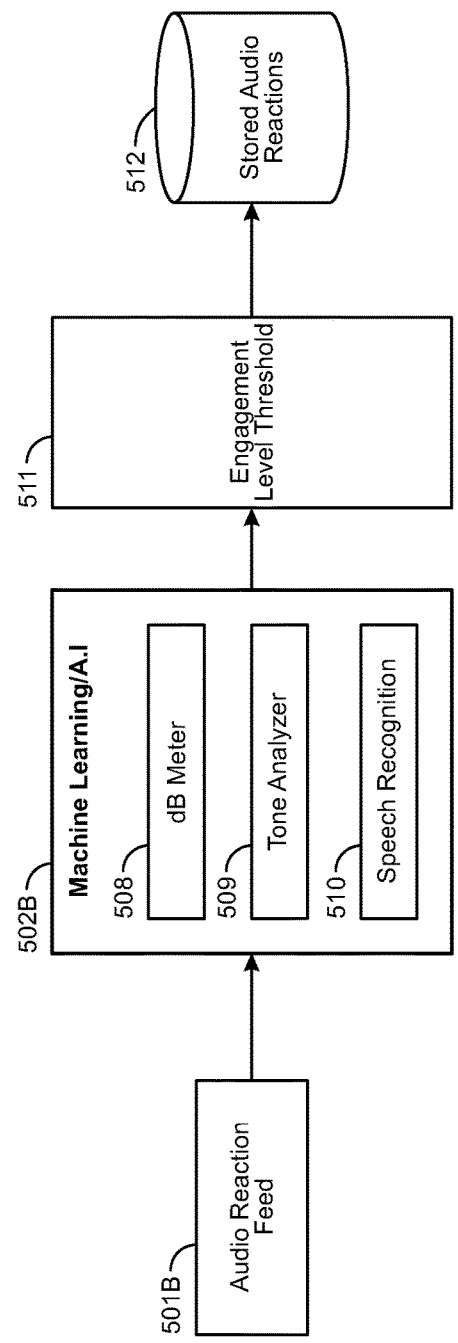

ASYNCHRONOUS CO-WATCHING

BACKGROUND

Consumers of content often like to share that content with friends and family. Such sharing often involves sending a link to a certain web address, or perhaps sending a direct link to the content within an application. The users typically view or otherwise consume this content on an asynchronous basis, where one user first views the content, and then sends the link to other users who subsequently view it.

Some content distribution networks have evolved to allow users to consume content simultaneously. For example, movie watching platforms allow groups of users to virtually gather in the same viewing room and then watch the same movie at the same time, despite being disparately located. During the movie, users can view each other's reactions to the movie, seeing the various group members get excited or sad right along with the movie. These systems, however, are designed only for synchronous consumption of the content.

SUMMARY

As will be described in greater detail below, the instant disclosure describes methods and systems that allow users to consume content previously consumed by other users and see those other user's reactions as they happened, synchronous with the content's original timeline. The initial users' reactions will only be shown, however, if they meet a minimum level of engagement. Thus, if an initial user consuming content is merely watching or listening without reacting, or is only reacting in a minimal fashion, those reactions may not be recorded. Rather, in some examples, only those reactions that are sufficiently involved, intense or engaging will be recorded. Users may configure the engagement level to their liking. Moreover, when viewing the reactions, users may select which display (or which portion of a display) will show the recorded reactions and which will show the main content. As such, users watching at a later time can have full control over which users' reactions they see, and on which device(s) they see the reactions.

In one example, a computer-implemented method for providing user reactions alongside content when the reactions meet a minimum level of engagement may include determining that a subsequent user is consuming content, at least some of which was consumed previously by an initial user. The method may include accessing various reactions by the initial user to the content that were recorded and synchronized as the initial user consumed the content. The method may also include determining that some of the reactions by the initial user have an engagement level above a predetermined threshold. The method may further include providing those reactions with engagement levels above the predetermined threshold to the subsequent user synchronously with the content as the content is consumed by the subsequent user.

In some examples, reactions by the initial user to the content include visible reactions, audible reactions, or user application or device input provided by the subsequent user. In some examples, the visible reaction may be a facial expression. In such cases, the engagement level of the facial expression may be above the predetermined threshold when the facial expression of the initial user corresponds to a predetermined facial expression or deviates from a predetermined baseline facial expression by a specified amount.

In some examples, when the visible reaction is a body gesture, the engagement level may be above the predetermined threshold when the body gesture corresponds to a predetermined body gesture or exceeds a predetermined baseline level of body movement. In some examples, when the reaction is an audible reaction, the engagement level of the audible reaction may be above the predetermined threshold when the audible reaction exceeds a predetermined volume, includes a predetermined tone, or includes specified words.

In some examples, the subsequent user may be using a client device to consume the content, and the reactions that have engagement levels above the predetermined threshold may be presented to the subsequent user at least in part on that same client device.

In some examples, the reactions with engagement levels above the predetermined threshold may be presented to the subsequent user at least in part within a picture-in-picture view on a same screen as the client device. In some examples, when the subsequent user is using a client device to consume the content, the reactions with an engagement level above the predetermined threshold may be presented to the subsequent user at least in part on a device other than the client device. In some examples, the reactions by the initial user were recorded by a camera or microphone associated with a client device on which the initial user consumed the content. In some examples, users may be given the ability to opt in to have their reactions recorded while consuming content.

In addition, a corresponding system for providing reactions alongside content when the reactions meet a minimum level of engagement may include several modules, at least some of which are stored in memory, including a processor, system memory, and a content monitoring module that determines that a subsequent user is consuming content, at some of which was consumed previously by a different, initial user. The system may also include a data accessing module that accesses reactions by the initial user to the content that were recorded and synchronized as the initial user consumed the content. The system may further include an engagement level determining module that determines that the reactions by the initial user have an engagement level above a predetermined threshold. The system may also include a content provisioning module that provides the reactions with engagement levels above the predetermined threshold for presentation to the subsequent user synchronously with the content as the content is consumed by the subsequent user.

In some examples, the system may send a notification to other users' computing devices if the reaction level is beyond a specified threshold. In some examples, the reactions by the initial user may include user inputs for a third-party application. In some examples, a limited subset of the initial user's reactions is provided synchronously with the content as the content is consumed by the subsequent user.

In some examples, the synchronizing module applies a timestamp to the content at a beginning portion of each of the initial user's reactions that have an engagement level above a predetermined threshold.

In some examples, the content was initially consumed by multiple users including the initial user. In such cases, reactions for the plurality of users may be separately recorded and synchronized. Still further, the presentation module may provide reactions for a specified subset of the users having engagement levels above the predetermined threshold for presentation to the subsequent user synchronously with the content as the content is consumed by the subsequent user. In some examples, the content is provided by a third party, and the content is annotated with timeline markers and reaction content.

In some examples, the system further includes a facial recognition module that implements machine learning and/or artificial intelligence to identify faces or facial features of the initial and/or subsequent users. The system may also include a voice analyzer that implements machine learning and/or artificial intelligence to recognize specific words, phrases or sounds in the reactions.

In some examples, the above-described method may be encoded as computer-readable instructions on a computer-readable medium. For example, a computer-readable medium may include one or more computer-executable instructions that, when executed by at least one processor of a computing device, may cause the computing device to determine that a subsequent user is consuming content, at least some of which was consumed previously by an initial user. The computing device may also access various reactions by the initial user to the content that were recorded and synchronized as the initial user consumed the content. The computing device may also determine that some of the reactions by the initial user have an engagement level above a predetermined threshold, and then provide the reactions with engagement levels above the predetermined threshold for presentation to the subsequent user synchronously with the content as the content is consumed by the subsequent user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5A illustrates an embodiment in which video reaction data is recognized and stored.

FIG. 5B illustrates an embodiment in which audio reaction data is recognized and stored.

Figure 1:
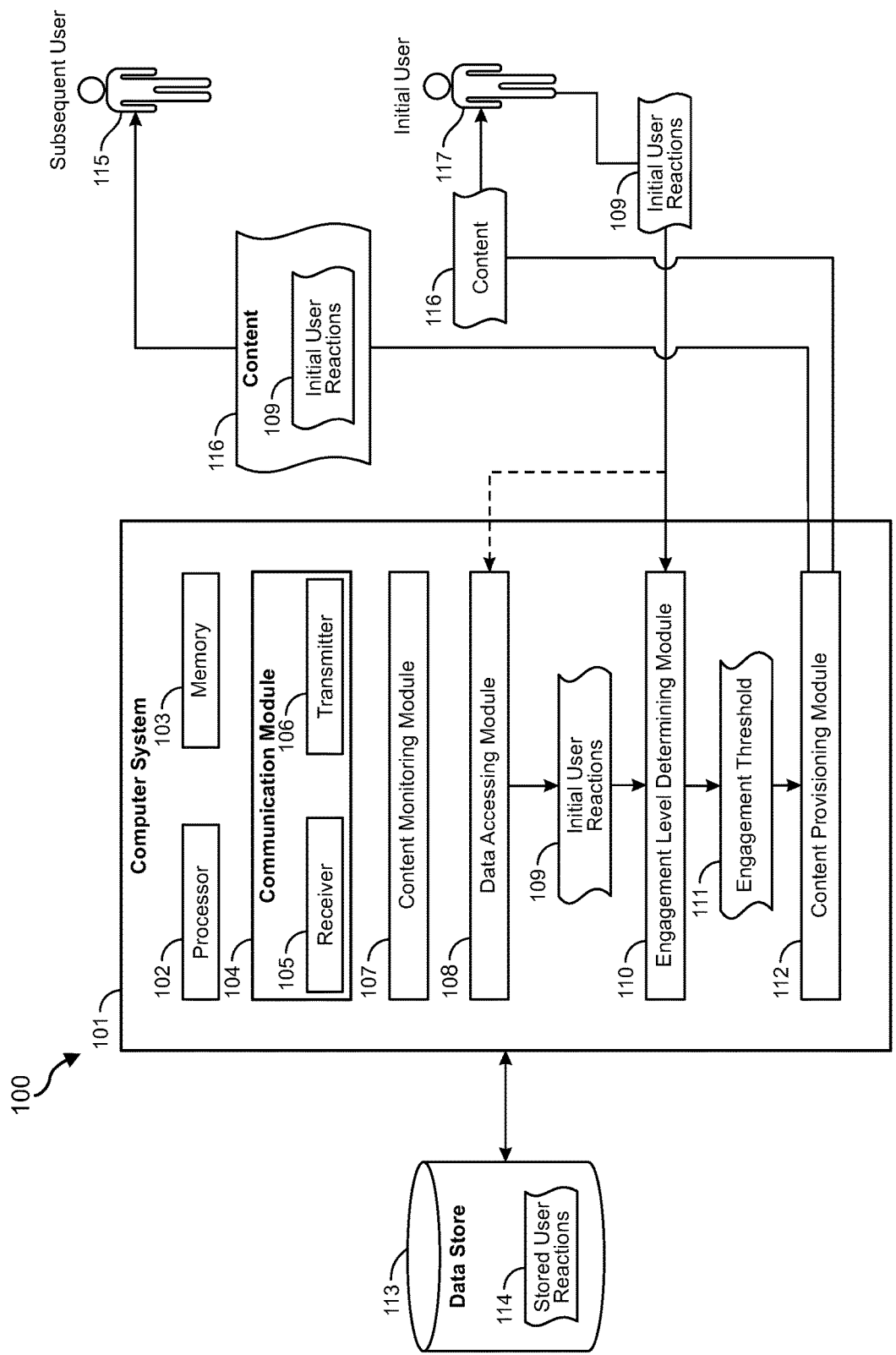
FIG. 1 illustrates a computer architecture in which embodiments described herein may operate, including providing reactions alongside content when the reactions meet a minimum level of engagement.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to system and methods that allow users to asynchronously consume content alongside initial users' reactions to that same content. In some embodiments, and as will be explained in greater detail below, an initial user may consume content (e.g., watch a movie or a baseball game on television) and, as the initial user consumes the content, live reactions by the initial user may be recorded and synchronized with the content. A subsequent user may later consume the same content (e.g., watch the movie or a replay of the baseball game), and at least some of the reactions by the initial user may be presented to the subsequent user synchronously with the content as it is consumed by the subsequent user. The reactions by the initial user presented to the subsequent user may be video recordings of the initial user (e.g., the initial user's face), audio recordings of the initial user (e.g., the initial user laughing or cheering), cross-platform activity related to the content (e.g., social-media posts about the content), or any combination thereof. The reactions by the initial user may be presented to the subsequent user on the same device on which the subsequent user is consuming the content (e.g., by picture-in-picture on a screen or through speakers of the device on which the subsequent user is consuming the content), or on another device (e.g., on a screen or through speakers of a mobile phone or other device of the user not being used to consume the content).

In some embodiments, only reactions by the initial user that are sufficiently interesting or sufficiently engaging or intense are presented to the subsequent user. For example, if the content is a movie and the initial user is just blankly, quietly watching the movie, then the reaction(s) by the initial user during that time may be insufficiently interesting to be presented to the subsequent user (or even to be recorded when live by the initial user). On the other hand, if the initial user's facial expression, gestures, speech, or sounds indicate a strong emotional response, then the reaction(s) by the initial user at the time of the emotional response may be sufficiently interesting to be presented to the subsequent user. Some embodiments may intelligently determine whether a reaction by the initial user is sufficiently interesting to be presented to the subsequent user and present only reactions by the initial user that are sufficiently interesting. Some embodiments may store reactions in a data store only if they are deemed to be sufficiently interesting. Whether a reaction by the initial user is sufficiently interesting may be determined in a variety of ways, including by a computer-vision analysis of video of the initial user during the live reaction, by a computer-audio analysis of the initial user during the live reaction, by a cross-platform activity analysis of the initial user's activities during (or immediately after) the reaction, or any suitable combination thereof.

The following will provide, with reference to FIGS. 1-8, detailed descriptions of how and when user reactions are recorded, and how those reactions are presented to other users. FIG. 1, for example, illustrates a computing architecture 100 in which many of the embodiments described herein may operate. The computing architecture 100 may include a computer system 101. The computer system 101 may include at least one processor 102 and at least some system memory 103. The computer system 101 may be any type of local or distributed computer system, including a cloud computer system. The computer system 101 may include program modules for performing a variety of different functions. The program modules may be hardware-based, software-based, or may include a combination of hardware and software. Each program module may use or represent computing hardware and/or software to perform specified functions, including those described herein below.

For example, communications module 104 may be configured to communicate with other computer systems. The communications module 104 may include any wired or wireless communication means that can receive and/or transmit data to or from other computer systems. These communication means may include radios including, for example, a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 may be configured to interact with databases, mobile computing devices (such as mobile phones or tablets), embedded systems, or other types of computing systems.

Computer system 101 may also include a content monitoring module 108. The content monitoring module 108 may be configured to monitor when users are consuming content. The content may be any type of user or computer-generated content including video, audio, written, web-based, social-media, application-based, or other types of content. In short, any type of data that can be presented to a user for consumption is contemplated herein, and that data may generally be referred to herein as content. Often, in the description below, the content will be described as video content, and consumption of the content will be referred to viewing, although this is chosen arbitrarily.

The content monitoring module 107 may determine that a subsequent user 115 is viewing content 116. This content 116 may have already been viewed by various other users, including an initial user 117. As these terms are used herein, the term "initial user" may, in some examples, refer to a user (or group of users) that consumes content and (at least in some cases) consents to having their reactions recorded. The term "subsequent user" may, in some examples, refer to any user that consumes the content at a later time. That later time may be only seconds after the content was viewed by the initial user (or less), or may be many hours, days, or years later.

As the initial user 117 is watching the content 116, his or her reactions 109 to the content may be recorded. These reactions 109 may be recorded on the device the user is using to view the content 116, or the reactions may be recorded by another local or remote computer system. The reactions may include, without limitation, visible reactions recorded by a video camera, audible reactions recorded by a microphone, application-related reactions (e.g., providing input such as typing or providing gestures to an application), social media-based reactions (e.g., liking a post, sending a short message to followers on a distributed messaging platform, commenting on a timeline, etc.), or any other type of gestures or bodily movement or device interaction that would indicate that the user is reacting to the content 116. As the user's reactions are recorded, the device taking the recording may generate a timestamp that notes when in the duration of the content 116 the reaction 109 occurred. These reactions 109 may then be saved in conjunction with the content 116, and may then be synchronized with the content. Accordingly, when the subsequent user 115 consumes the content 116, the initial user's reactions 109 may be displayed or otherwise presented along with the content. Where and how the reactions are presented to the user will be addressed in greater detail below.

The data accessing module 108 of computer system 101 may be configured to access other user's reactions, including initial user 117's reactions 109. These reactions may be stored, for example, in data store 113. Such stored user reactions 114 may be accessed via a local or remote network connection, or via a system bus if the data store is part of computer system 101. In other cases, the initial user's reactions 109 may be accessed by the data accessing module 108 as they are happening, and may be provided to the engagement level determining module 110.

The engagement level determining module 110 of computer system 101 may be configured to determine the size or magnitude of the initial user's reactions. If a given reaction 109 is a change in facial expression, for example, or an act of jumping up and down, the engagement level determining module 110 may determine how much the user's face has changed from a baseline level, or may determine how much the user's body has moved from a resting position. The engagement level determining module 110 may also be able to distinguish between mere movement (such as repositioning for a more comfortable position) and reaction to the content. If the reaction 109 is an audible reaction, the engagement level determining module 110 may determine that a threshold decibel level has been reached, or that a given tone was used during the reaction, or that specific words were spoken. If the reaction 109 is an application-based reaction, the engagement level determining module 110 may determine which inputs were supplied to the application, or may determine the outcome of those inputs. If the reaction 109 is social-media-based, the engagement level determining module 110 may determine which comments were made, or which posts were liked, or which photos were shared, etc.

Each type of reaction may have its own threshold level 111 for what qualifies as engaging enough to present to the subsequent user 115. As will be understood, each type of reaction has different characteristics, and different triggering mechanisms that identify the actions as a reaction to content or not. In many cases, the user's actions will not rise to the level of engagement necessary to merit presentation to the subsequent user. However, when reactions do rise to the threshold level 111 for that engagement type, the reaction may be recorded and marked with a timestamp. Accordingly, when the content 116 is presented to subsequent users (e.g., user 115) by the content provisioning module 112, the initial user's reactions 109 may be presented synchronously along with the content.

Figure 2:
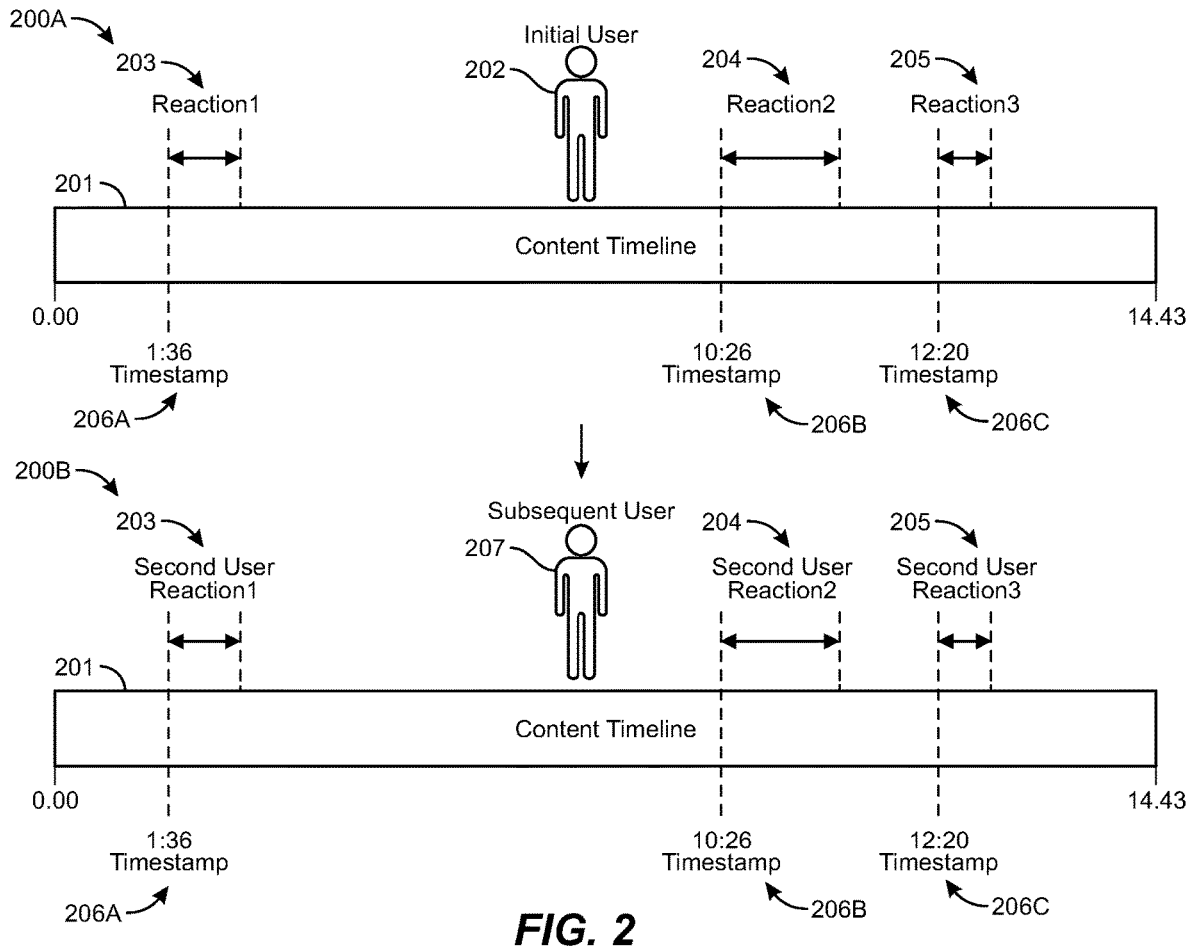
FIG. 2 illustrates an embodiment in which content consumed and reacted to by a user is viewed by another user.

FIG. 2 illustrates an example of such a content presentation. In 200A, a content timeline 201 is shown that represents the duration of the content. The content timeline 201 starts at time 0:00 and goes to its end point at 14:43. While the initial user 202 is viewing the content, they may have reactions to that content. These reactions may be positive or negative, and may come in a variety of forms. As noted above with regard to FIG. 1, the engagement level determining module 110 may determine which reactions 109 are sufficiently engaging to be recorded and synchronized with the content. Accordingly, the engagement level determining module 110 of FIG. 1 may determine that reaction 1 (203) occurs at 1:30 in timeline 201, and receive timestamp 206A. Reaction 1 lasts for a specific amount of time, as indicated by the arrow and dotted lines. Methods for determining the length of each reaction will be further described below.

Continuing along the timeline 201, reaction 2 (204) (which is longer in duration) occurs at 10:26 and receives timestamp 206B, and reaction 3 (205) (which is much shorter in duration) occurs at 12:20 and receives timestamp 206C. Then, at 200B when the subsequent user 207 views the content, the same content timeline 201 is provided, but the content has the initial user's reactions appended thereto. The initial user's reactions are presented on a desired display or device at the exact moment they occurred when the initial user originally consumed the content. In this manner, the subsequent user 207 can experience the initial user's reactions as if the subsequent user were watching the content live with the initial user. These concepts will be explained in greater detail below with regard to method 300 of FIG. 3.

Figure 3:
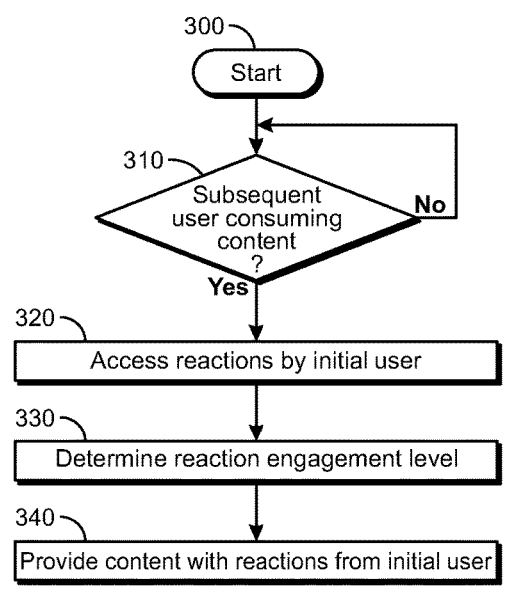
FIG. 3 illustrates a flow diagram of an exemplary method for providing reactions alongside content when the reactions meet a minimum level of engagement.

FIG. 3 illustrates a flow diagram of an exemplary computer-implemented method 300 for providing user reactions alongside content when the reactions meet a minimum level of engagement. The steps shown in FIG. 3 may be performed by any suitable computer-executable code and/or computing system, including the computer system 101 illustrated in FIG. 1. In one example, each of the steps shown in FIG. 3 may represent an algorithm whose structure includes and/or is represented by multiple sub-steps, examples of which will be provided in greater detail below.

FIG. 3, for example, starts at 300 and proceeds to a determination at 310. This determination may be performed by content monitoring module 107 of FIG. 1. The content monitoring module 107 may monitor user activity to determine that a subsequent user is consuming content, where at least some of that content was consumed previously by an initial user. For example, as illustrated in FIG. 1, initial user 117 may consume content 116, and may react when watching or otherwise consuming that content.

In at least some embodiments, the initial user may provide consent for their reactions to be recorded. The initial user 117 may provide consent for all their reactions to be recorded, or for only a select subset of their reactions to be recorded. For instance, the initial user 117 may indicate that audio and video reactions can be recorded, but that social-media-based reactions cannot. The application or platform the initial user is using to view the content may provide the initial user with a variety of privacy options that allow the user to specify which reactions (or which types of reactions) can be recorded. The initial user may also be able to go back and delete certain reactions, or specify that only certain users can see certain reactions. Thus, the systems described herein are flexible enough to allow the initial user to specify which reactions are seen by which people. In some examples, the initial user can opt out of all reaction recording if desired.

Once the initial user 117 has begun consuming the content 116, the data accessing module 108 may be configured to access the content 116 (at step 320 of FIG. 3) along with the reactions 109 by the initial user to the content that were recorded and synchronized at the time of consumption. The data accessing module 108 may access the reactions 109 substantially as they occur and store them in long-term and/or short-term memory. The data accessing module 108 may then provide these initial user reactions 109 to the engagement level determining module 110.

The engagement level determining module 110 may determine (at step 330 of FIG. 3) that some of the reactions by the initial user 117 have an engagement level above a predetermined threshold 111. This engagement level may be different for each type of reaction 109 provided by the initial user. In some embodiments, the initial user 117 may specify what the engagement threshold is for each reaction type. As such, only those reactions meeting the engagement threshold 111 would be recorded. Additionally or alternatively, the subsequent user 115 may specify what the engagement threshold 111 is for each content type. In this context, the engagement threshold would specify which of the initial user's recorded reactions the subsequent user wants to see. Any reactions below the threshold 111 would be filtered out and not shown to the subsequent user 115. In this manner, the recording user (i.e., initial user 117) and the subsequent consuming user 115 may each separately specify which reactions are to be recorded and which are to be consumed with the content. This allows each user a great deal of customizability and control over which actions are taken with respect to the initial user's reactions 109.

Once the engagement threshold 111 has been specified, the content provisioning module 112 may then provide (at step 340) those reactions that have engagement levels above the predetermined threshold for presentation to the subsequent user. These reactions 109 may be provided synchronously with the content as the content is consumed by the subsequent user 115. As shown in FIG. 2, the initial user's reactions are each recorded and timestamped (see, for example, timestamps 200A, 200B and 200C). Each reaction may begin at a time that coincides with the initial users' body movement, facial movement, yell, scream, social media post, or other reaction, and may continue until the computer system determines that the initial user has returned to a position, expression, or volume level that existed prior to the beginning of the reaction. Machine learning and artificial intelligence (AI) may be used to analyze video and/or audio feeds to determine the transition times between little or no reaction, and reaction engaging enough to be categorized as a recordable reaction. Machine learning and AI may also be used to determine when the reaction is over and, thus, when the reaction recording should be stopped. In some cases, the beginning and end of each reaction may each be timestamped with separate timestamps.

Figure 4:
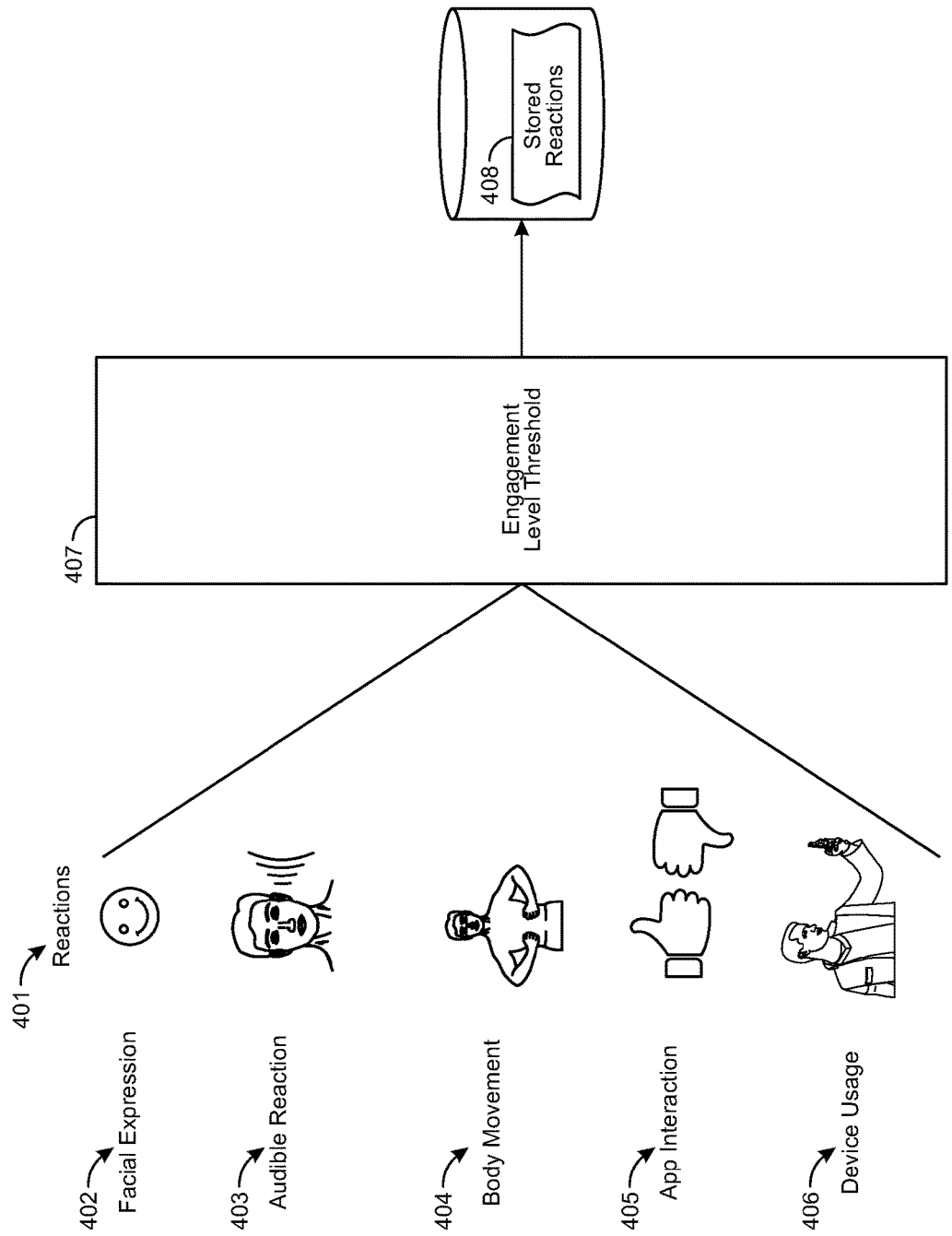
FIG. 4 illustrates various reactions that can be stored upon meeting the minimum engagement level.

FIG. 4 illustrates various types of reactions 401 that the initial user might have with respect to a piece of content. The user might, for example, make facial expressions 402 that indicate the user's like or dislike for the piece of content. The user may smile or raise their eyebrows or make other facial expressions that show a positive reaction. Similarly, the user may frown, pout, or cry, indicating a negative reaction to the content. Furthermore, the user may react in an audible manner (403). Such audible reactions may include shouting, cheering, or yelling in a loud manner. Other audible reactions may include a tone that exhibits disappointment or perhaps fear. Still other audible reactions may be processed by machine learning or AI software that interprets the sounds and identifies words. These identified words can then be analyzed to determine whether the words connote like or dislike for the content. In some cases, the identified phrases may be context-specific, such as cheering for specific team or player, or a more general cheer for offense or defense.

In some embodiments, the reactions 401 may include body movement 404 such as standing up, jumping, fist pumping, high-fiving another viewer, sitting down, slouching, falling asleep, slapping a knee, pounding a table, throwing an object, or otherwise performing a bodily action that is interpretable as a reaction. The body movement may be captured by cameras, wearable devices (e.g., smart watches), virtual reality devices, spatial sensors, pedometers, or other hardware or software systems designed to capture body motion.

In some embodiments, the reactions 401 may include application interactions 405. For example, while a user is consuming content, the user may interact with applications such as an internet browser, a game, a social media application or other type of application. The initial user may use the application to comment on the content they are consuming, or may comment on other posts or news articles, perhaps indicating a lack of interest in the content. The user may take actions inside applications that indicate a like or dislike for the content, such as explicitly providing a like or dislike indication to a social media application that is providing the content. Additionally or alternatively, the user may use an application to provide commentary related to the content, whether verbally, textually, or via video. Any number of application interactions or internet web page interactions are possible, and any may be recorded as a stored reaction 408 if the engagement level threshold 407 is met for that reaction. Still further, any type of device usage 406 may be tracked and recorded, including taking pictures, sending text messages, sending emails, or making phone calls. Again, in most embodiments, such activity tracking will be provided only on an opt-in basis to protect the privacy of the initial user. In some cases, these device usage reactions may only be provided to users selected by the initial user.

Determining whether a reaction 401 will be recorded is governed by an engagement level threshold 407, and may additionally be determined by policy. As noted above, the initial consumer of the content may have full control to permit or prevent all recording of reactions. In the examples below, it is assumed that the initial user has provided consent for others to experience their reactions. In some cases, the initial user may be able to select which users see which types of reactions, or which level of reactions. Thus, a subsequent user may only see those reactions that were of a certain type, or were sufficiently intense or engaging to merit sharing with that user.

The engagement level threshold 407 may be set individually for each specific reaction within a reaction type, or may be set generally for the entire reaction type. In the case of a facial expressions (e.g., 402), for example, the engagement level of the facial expression may be above the predetermined threshold 407 when the facial expression of the initial user corresponds to a predetermined facial expression (e.g., the facial expression matches that of a smile), or deviates from a predetermined baseline facial expression by a specified amount. In some cases, the visible reaction may be a body gesture (e.g., 404). In such cases, the engagement level 407 may be above the predetermined threshold when the body gesture corresponds to a predetermined body gesture (e.g., clapping hands or facepalming), or exceeds a predetermined baseline level of body movement (e.g., jumping up out of a chair). In some cases, when the reaction 401 is an audible reaction (403), the engagement level of the audible reaction may be above the predetermined threshold 407 when the audible reaction exceeds a predetermined volume, includes a predetermined tone, or includes predetermined words. Each of these scenarios will be described more fully below with regard to FIGS. 5A-5C.

Figure 5C:
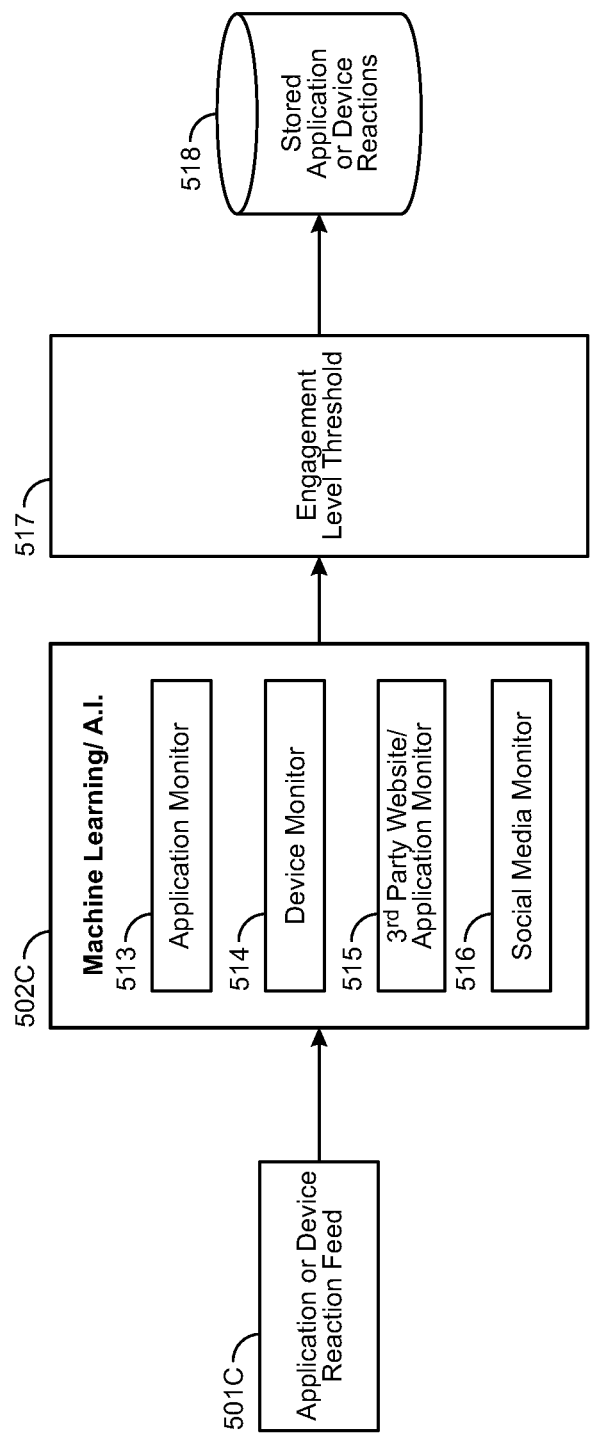
FIG. 5C illustrates an embodiment in which application or device reaction data is recognized and stored.

Machine learning and/or artificial intelligence may be used to identify words, gestures, facial expressions, device activity, social media activity, or actions that may be interpretable as a reaction to content. As shown in FIGS. 5A-5C, machine learning and AI hardware and/or software modules may be used to perform a variety of determinations. For example, as shown in FIG. 5A, a video reaction feed 501A may be sent to a machine learning/AI module 502A. The machine learning/AI module 502AA may itself include various modules including a facial recognition module 503, a facial movement monitor 504, and a body movement monitor 505. The facial recognition module 503 may be configured to observe a user's face and determine what type of facial expression that user is making. The facial recognition module 503 may access the video reaction feed 501A which may include camera and/or sensor data from a user device. The video reaction feed 501A may include just the face of the user, or may include the user's full body. The facial recognition module 503 may map the user's face in a rested state to determine the user's natural look including the position of their eyes, nose, mouth, hair, eyebrows, chin, ears or other features. The facial recognition module 503 may be configured to confirm the user's identity, as well as work with the facial movement monitor 504 to determine when the user's face has changed expressions.

Upon determining that the user's face has changed expressions, the machine learning/AI module 502A may determine how much of a change has occurred. The machine learning/AI module 502A may determine that a single feature has changed, or that multiple facial features have changed. The machine learning/AI module 502A may determine that some facial features have changed a little, while others have changed a lot. The detected changes may be categorized as positive, negative, or neutral. Facial movements that correspond to a strongly positive or strongly negative emotion may be those that pass the engagement level threshold 506. In other cases, facial movements that are only moderately positive or negative may pass the engagement level threshold 506. This threshold 506 may be established specifically for facial expressions, and may be configurable by the initial user whose facial expressions are being captured, or may be configurable by the subsequent user who is viewing the user's reactions in the form of facial expressions.

Still further, the body movement monitors of the machine learning/AI module 502A may receive the video reaction feed 501A and perform calculations to determine whether a body movement has occurred and, if so, which type of body movement has occurred. The body movement monitor 505 may be configured to match the user's body movements to previously identified body movements, or may be configured to determine an overall amount of body movement. Once determined, this detected body movement may be compared to the engagement level threshold 506 to determine if it is sufficient to qualify as a reaction that should be stored (e.g., 507) and provided to subsequent users.

FIG. 5B illustrates a machine learning/AI module 502B that may include hardware and/or software that is the same or different than that of FIG. 5A. The machine learning/AI module 502B of FIG. 5B may receive an audio reaction feed 501B from an initial user. The machine learning/AI module 502B may include a decibel (dB) meter 508 that determines a sound level for the audio reaction feed 501B. In some cases, the engagement level threshold 511 may specify a minimum sound level or dB measurement. If the sound level is loud enough, it will be stored as a recorded audio reaction 512.

The machine learning/AI module 502B may also include a tone analyzer 509. This tone analyzer 509 may be configured to receive the audio reaction feed 501B and analyze the tones of the initial user's speech. If certain excited or happy tones are detected, this may be sufficient to pass the engagement level threshold 511. Similarly, if certain demure or sad tones are detected, this may be sufficient to pass the threshold 511. If the tone analyzer 509 detects intense or unusually quiet tones of voice, these may also be recorded as audio reactions 512. Over time, the machine learning/AI module 502B may improve at recognizing tones, and may learn which tones are indicative of reactions that should be recorded, and which are not of interest.

The machine learning/AI module 502B may also include a speech recognition module 510 that is configured to recognize the words spoken by the initial user. The speech recognition module 510 may be configured to analyze the audio reaction feed 501B and determine which sounds are words, and then identify which words they are. The speech recognition module 510 may simply recognize the words and then provide them to the processor for determining whether the words meet the engagement level threshold 511. Or, the speech recognition module 510 may itself determine whether the words are sufficient to qualify as reactions and be stored in a data store for consumption by other subsequent users.

FIG. 5C includes a machine learning/AI module 502C that includes modules including an application monitor 513. The application monitor 513 may be configured to access an application or device reaction feed 501C that indicates how the initial user is reacting to a piece of content. The application or device reaction feed 501C may include different types of information about how the initial user is using their device, including which applications they are using, how they are interacting with the applications, which types of social media platforms they are using, how they are interacting with those platforms, or may identify other interactions with their device or with applications on the device. The application monitor 513 may identify the user's interactions with applications and match them against an engagement level threshold 517 for application reactions. If the application reactions qualify as being sufficiently engaging, they will be stored in a data store as recorded reactions 518. Similarly, the device monitor 514 may be configured to identify the initial user's interactions with the electronic device they are using to consume the content. These interactions may be compared to a threshold engagement level 517 for device interactions and, if deemed sufficiently engaging, will be stored as reactions 518.

The machine learning/AI module 502C may also include a third-party website or application monitor 515 that is configured to monitor the initial user's interactions with third party websites or applications. Still further, the machine learning/AI module 502C may include a social media monitor 516 that monitors the initial user's activities related to social media platforms. Between these two modules (515 & 516), all or a select portion of the initial user's activities online or related to applications may be monitored (with that user's permission). If the user is making comments, sending short messages, liking posts, uploading pictures or video, reading news feeds or timelines, or otherwise interacting with a website or social media platform, the third-party website or application monitor 515 and/or social media monitor 516 may track inputs and actions performed, and record those that pass the engagement level threshold 517 for those types of reactions.

Figure 6A:
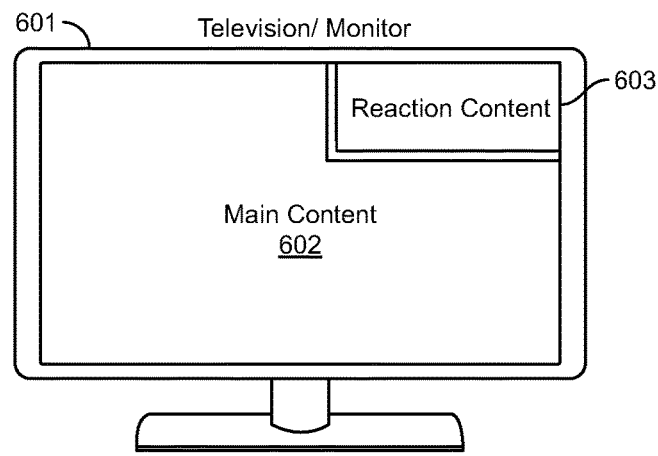
FIG. 6A illustrates an embodiment in which main content is displayed on a main portion of a monitor, and reaction content is displayed on a smaller portion of the monitor.

Regardless of which form the initial user's reactions take, the reactions may be presented to subsequent users in a variety of different forms. In FIG. 6A, for example, the main content (e.g., a television program) may be shown on a large portion of a television or monitor 601, while the reaction content 603 is shown in a picture-in-picture format in a corner of the monitor. In such cases, those reactions with engagement levels above the predetermined threshold (e.g., 517 of FIG. 5C) may be presented to the subsequent user in the picture-in-picture view on the same screen. If the subsequent user is viewing the content 602 and reactions 603 on a mobile device, the main content may be displayed on a large portion of the mobile device, and the reaction content may be displayed in a smaller, picture-in-picture portion of the mobile device. In some cases, if the reactions are distributed messages or likes of certain posts, those messages or like notifications may be overlaid over the main content on the same device the user is using to consume the main content. Thus, whether the main content is being viewed on a television, monitor, tablet, phone, watch or other device, the reaction content 603 may be displayed in a corner of the display in a picture-in-picture mode, or the reaction content may be overlaid over the main content in some fashion.

Figure 6B:
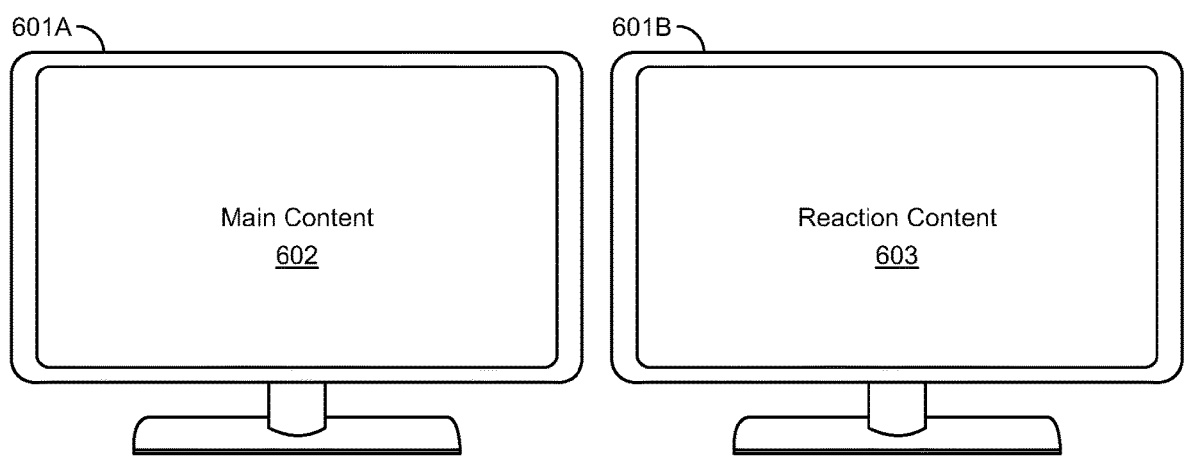
FIG. 6B illustrates an embodiment in which main content is displayed on one monitor, and reaction content is displayed on another monitor.
Figure 6C:
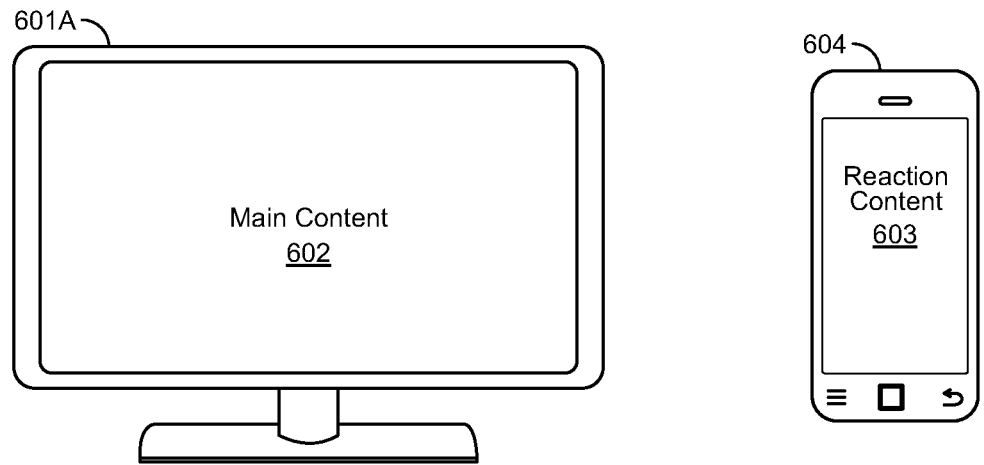
FIG. 6C illustrates an embodiment in which main content is displayed on a monitor, and reaction content is displayed on a mobile device.
Figure 6D:
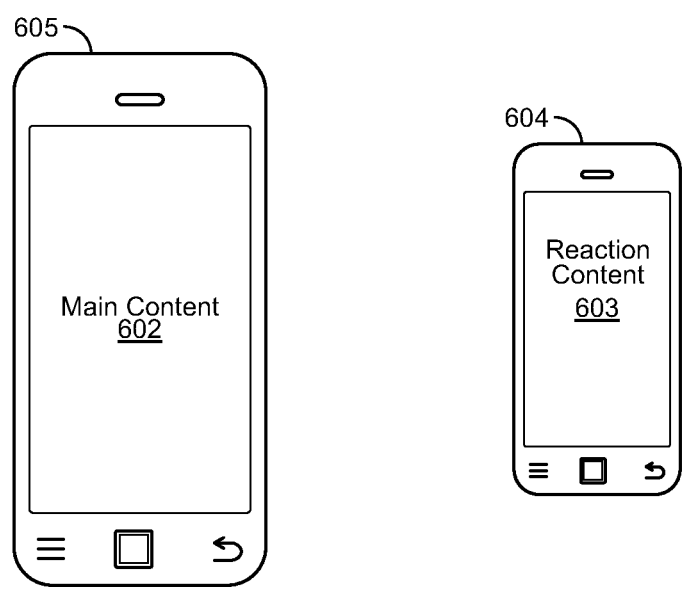
FIG. 6D illustrates an embodiment in which main content is displayed on a tablet, and reaction content is displayed on a mobile device.

In some examples, when the subsequent user is using a client device to consume the content, the reactions with engagement levels above the predetermined threshold may be presented to the subsequent user at least in part on a device other than the client device (see, for example, FIGS. 6B-6D). In some examples, the reactions by the initial user may be recorded by a camera or microphone associated with a client device on which the initial user consumed the content. Many other scenarios are also possible for displaying main content and reaction content.

FIG. 6B, for example, illustrates an embodiment in which the main content 602 is displayed on one television or monitor 601A, and the reaction content 603 is displayed on a different television or monitor 601B. These monitors may be right next to each other as shown, or may be separated by some distance. In other embodiments, as shown in FIG. 6C, the main content 602 may be shown in a television or monitor 601, while the reaction content 603 is shown in a mobile device 604 such as a phone, tablet or watch. The reaction content 603, whether shown in the same monitor or in a separate device, is synchronized with the main content 602, and aligns with the timestamps 200A-200C created in FIG. 2.

Similarly, in FIG. 6D, main content 602 may be shown in a tablet 605, and the reaction content 603 may be shown in a mobile phone 604. As one skilled in the art will appreciate, substantially any combination of the above is possible. Moreover, each subsequent user may be able to configure how and where the reaction content is shown using settings or policies. These policies may be user-specific (such that when viewing one user's reaction content, it is displayed in the manner of FIG. 6B, and another user's content is displayed in the manner shown in FIG. 6C, for example). Or, the policies may be content-specific (such that when viewing television shows, reaction content is displayed in the manner shown in FIG. 6A, while when viewing movies, reaction content is displayed in the manner shown in FIG. 6B). In some cases, the subsequent user may provide gestures or touch inputs to indicate where or on which device the reaction content is to be displayed.

Figure 7:
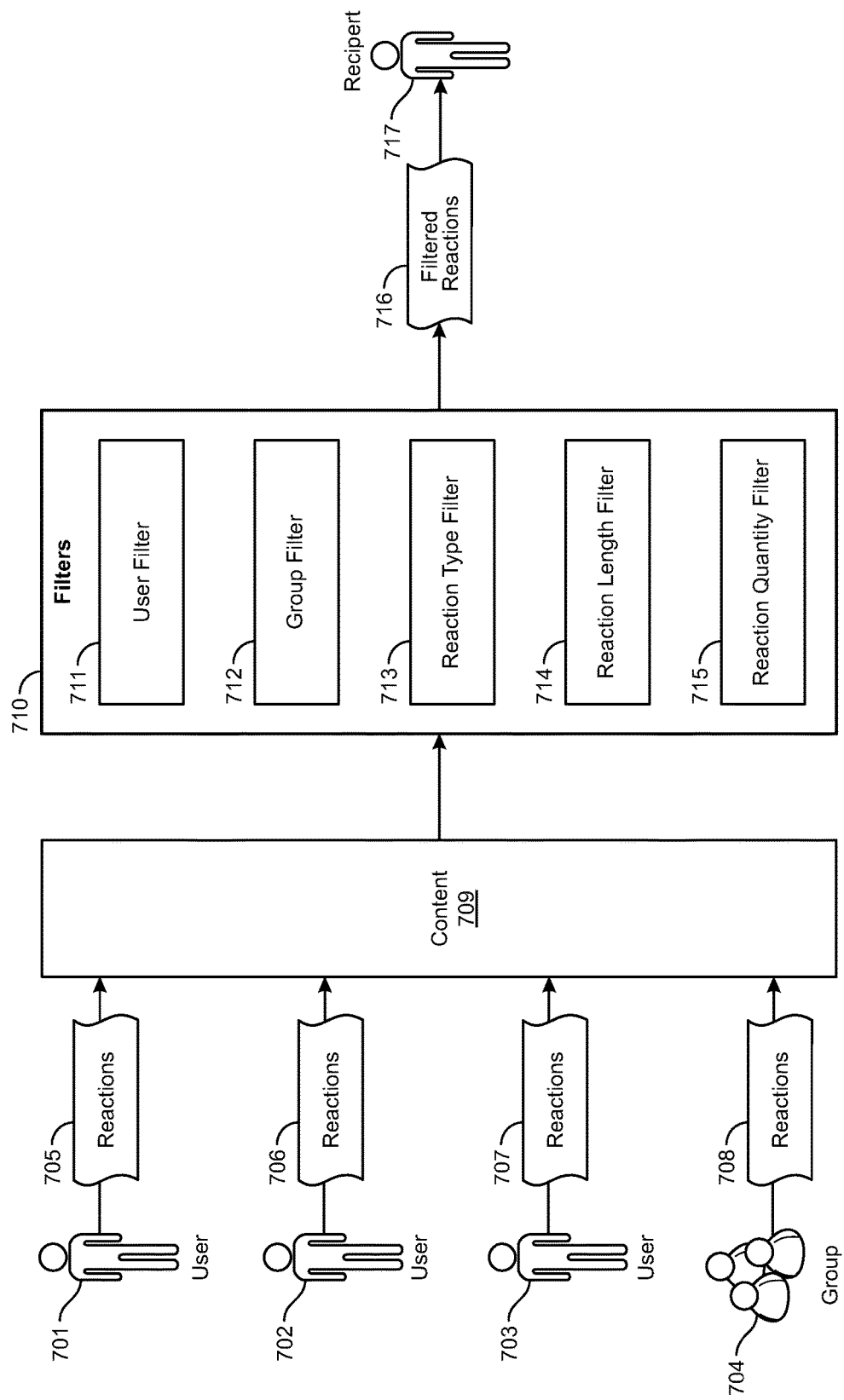
FIG. 7 illustrates an embodiment in which user reactions are filtered according to different filters.

There may be instances when a subsequent user doesn't want to see all the reactions that met the engagement level threshold. Accordingly, and as shown in FIG. 7, various filters 710 may be implemented to reduce the number of reactions shown to the subsequent user. Each subsequent user may have full control over which reactions, which reactions types, and which specific user's reactions they see. The subsequent user may initially receive a notification (via email, text, application notification, etc.) that a piece of content with associated reactions is available for consumption. The notification may have a link to the content, or may include the content directly. Prior to viewing the content, the subsequent user may have the opportunity to set filters that apply to that piece of content, or filters that apply to content from certain people or certain content types in general. Once the subsequent user has set the filters, the computer system may provide a limited subset of the initial user's reactions. This limited subset of reactions is provided synchronously with the content as the content is consumed by the subsequent user.

In FIG. 7, a piece of content 709 may be consumed by multiple initial users (701, 702, 703 and group 704). User 701 provides reactions 705, user 702 provides reactions 706, user 703 provides reactions 707, and group 704 provides reactions 708. Without any filters, all of these reactions (that met the engagement level threshold) would go to the subsequent user in their entirety. This may become burdensome to the user. As such, the subsequent user (i.e., recipient 717) may implement a user filter 711, for example, to only receive reactions 706 from user 702, and reactions 707 from user 703. In such cases, the user filter 711 would filter out the reactions 705 from user 701 and reactions 708 from group 704. If the recipient 717 were to change their mind and elect to receive reactions 708 from group 704, the recipient may use the group filter 712 to filter out reactions from within the group.

For example, the computer system may use machine learning and/or AI to determine (by voice or facial recognition, or by username within an application) which user from among the group of users is providing the reaction. Each user's reaction may be separately identified, time-stamped, and synchronized with the content in the manner described above. Then, although the recipient 717 may be subscribed to receive reactions 708 from the group 704, the recipient will only receive reactions from those users within the group that were selected by the recipient. As group members' reactions are detected and recorded (if sufficiently engaging), the computer system may be configured to arrange lists of top reactions, or wildest reactions, or funniest reactions, etc. These lists may be generated automatically based on the recorded video, audio or application data, or may be generated by users.

The reaction type filter 713 allows the recipient 717 to filter the reactions from the various users by reaction type. Thus, the user may look at the various reaction types available (e.g., those listed under 401 of FIG. 4), and may opt to only receive certain reaction types. For example, regardless of who is providing the reactions, the recipient 717 may only wish to see visible and audible user reactions. Other users may only be concerned with social media reactions. Thus, the recipient 717 can use the reaction type filter 713 to filter reactions based on reaction type. Similarly, the recipient 717 can use the reaction length filter 714 to filter out reactions that are too short or too long, and may also use the reaction quantity filter 715 to filter out reactions based on their quantity. For example, the recipient of the filtered reactions 716 may only wish to see the first 15 reactions, or may only wish to see reactions from those people that reacted less than five times. All of these filters may be used in combination with each other to create the recipient's own perfect blend of reactions. This may be especially beneficial in cases where the content is public and many hundreds or thousands of people have watched and reacted to it. Filters can provide the unique viewing experience desired by the recipient 717.

In some examples, the content may be provided by a third party. For instance, movie or television content may be provided by an online video streaming service. In such cases, the systems herein may be configured to access the content (or at least its associated metadata) and annotate that content (or metadata) with timeline markers representative of when the reactions are to occur. Then, a separate feed of reaction content may be provided to the subsequent user, synchronized with the third-party-provided main content. Native content may be similarly annotated, although the reaction content may be more deeply embedded or integrated with the main content.

In some examples, the above-described method may be encoded as computer-readable instructions on a computer-readable medium. For example, a computer-readable medium may include one or more computer-executable instructions that, when executed by at least one processor of a computing device, may cause the computing device to determine that a subsequent user is consuming content, at least some of which was consumed previously by an initial user. The computing device may also access various reactions by the initial user to the content that were recorded and synchronized as the initial user consumed the content. The computing device may also determine that some of the reactions by the initial user have an engagement level above a predetermined threshold, and then provide the reactions with engagement levels above the predetermined threshold for presentation to the subsequent user synchronously with the content as the content is consumed by the subsequent user.

Figure 8:
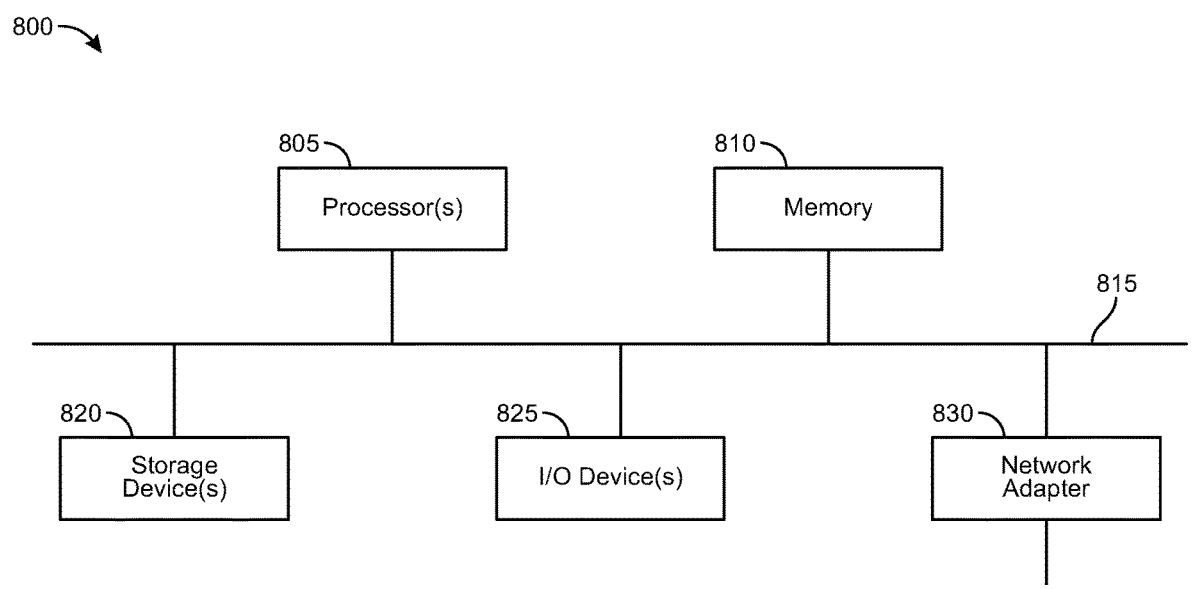
FIG. 8 illustrates a computing environment in which the embodiments described herein may be carried out.

FIG. 8 is a block diagram of a computer system that may be used to implement features of some of the embodiments, e.g., to implement the content provisioning module. The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The memory 810 and storage devices 820 may represent computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 830).

Accordingly, systems and methods may be provided that allow subsequent users to view content previously viewed by initial users and see those initial user's reactions alongside the original content. In order for a reaction to be stored and then shown to subsequent users, the reaction should meet a minimum level of engagement. In this manner, the subsequent users aren't inundated with uninteresting reactions. Rather, only those reactions that are of interest to the subsequent user will be shown. Filters may be used to specifically select certain types of reactions, or reactions from certain users. Upon viewing the content, the subsequent user may select which device or devices show the main content and which show the reaction content. Accordingly, users watching at a later time can have full control over which users' reactions they see, and on which devices they see the reactions.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

I claim:

1. A computer-implemented method comprising:
   determining that a subsequent user is consuming video content, at least a portion of which was consumed previously by an initial user;
   accessing one or more reactions by the initial user to the video content that were recorded and synchronized as the initial user consumed the content, the one or more reactions including at least one live video reaction capturing the initial user;

determining that one or more of the reactions by the initial user including the live video reaction have an engagement level above a predetermined threshold, the engagement level being subject to individual definition by the initial and subsequent users, allowing the initial user to specify a customized engagement level above which the initial user's reactions are recorded, and allowing the subsequent user to specify a customized engagement level above which the initial user's reactions are presented for viewing; and upon determining that the reactions by the initial user have met the customized engagement levels defined by the initial and subsequent users, automatically presenting the one or more reactions including the live video reaction to the subsequent user synchronously with the video content as the video content is consumed by the subsequent user.

2. The method of claim 1, wherein one or more of the reactions by the initial user to the video content comprises at least one of a visible reaction by the initial user, an audible reaction by the initial user or a user input provided by the initial user.

3. The method of claim 2, wherein the visible reaction comprises a facial expression, and wherein the engagement level of the facial expression is above the predetermined threshold when the facial expression of the initial user corresponds to a predetermined facial expression or deviates from a predetermined baseline facial expression by a specified amount.

4. The method of claim 2, wherein the visible reaction comprises a body gesture, and wherein the engagement level is above the predetermined threshold when the body gesture corresponds to a predetermined body gesture or exceeds a predetermined baseline level of body movement.

5. The method of claim 2, wherein the engagement level of the audible reaction is above the predetermined threshold when the audible reaction:
exceeds a predetermined volume;
comprises a predetermined tone; or
comprises one or more predetermined words.

6. The method of claim 1, wherein the subsequent user is using a client device to consume the video content, and wherein one or more of the reactions with engagement levels above the predetermined threshold are presented to the subsequent user at least in part on the same client device.

7. The method of claim 6, wherein one or more of the reactions with engagement levels above the predetermined threshold are presented to the subsequent user at least in part with a picture-in-picture view on a same screen as the client device.

8. The method of claim 1, wherein the subsequent user is using a client device to consume the video content, and wherein one or more of the reactions with engagement levels above the predetermined threshold are presented to the subsequent user at least in part on a device other than the client device.

9. The method of claim 1, wherein one or more of the reactions by the initial user were recorded by a camera or microphone associated with a client device on which the initial user consumed the video content.

10. The method of claim 1, wherein the initial user opted in to have live reactions of the initial user recorded.

11. A system comprising:
a processor;
system memory;
a video content monitoring module that determines that a subsequent user is consuming video content, at least a portion of which was consumed previously by an initial user;
a data accessing module that accesses one or more reactions by the initial user to the video content that were recorded and synchronized as the initial user consumed the video content, the one or more reactions including at least one live video reaction capturing the initial user;
an engagement level determining module that determines that one or more of the reactions including the live video reaction by the initial user have an engagement level above a predetermined threshold, the engagement level being subject to individual definition by the initial and subsequent users, allowing the initial user to specify a customized engagement level above which the initial user's reactions are recorded, and allowing the subsequent user to specify a customized engagement level above which the initial user's reactions are presented for viewing; and
a video content provisioning module that, upon determining that the reactions by the initial user have met the customized engagement levels defined by the initial and subsequent users, automatically presents the one or more reactions including the live video reaction to the subsequent user synchronously with the video content as the video content is consumed by the subsequent user.

12. The system of claim 11, further comprising sending a notification to one or more other users' computing devices if the engagement level is beyond a specified threshold.

13. The system of claim 11, wherein at least one of the one or more reactions by the initial user comprise user inputs for a third-party application.

14. The system of claim 11, wherein a limited subset of the initial user's reactions is provided synchronously with the video content as the video content is consumed by the subsequent user.

15. The system of claim 11, wherein a synchronizing module applies a timestamp to the video content at a beginning portion of each of the initial user's reactions that have an engagement level above a predetermined threshold.

16. The system of claim 11, wherein the video content was consumed by a plurality of users including the initial user, and wherein reactions for the plurality of users are separately recorded and synchronized.

17. The system of claim 16, wherein a presentation module provides reactions for a specified subset of the plurality of users having engagement levels above the predetermined threshold for presentation to the subsequent user synchronously with the video content as the video content is consumed by the subsequent user.

18. The system of claim 11, wherein the video content is provided by a third party, and wherein the video content is annotated with timeline markers and reaction content.

19. The system of claim 11, further comprising at least one of:
a facial recognition module that implements machine learning and/or artificial intelligence to identify faces or facial features of the first and/or initial users; or
a voice analyzer that implements machine learning and/or artificial intelligence to recognize specific words, phrases or sounds in the reactions.

20. A nontransitory computer-readable medium comprising:

computer-readable instructions that, when executed by at least one processor of a computing device, cause the computing device to:
- determine that a subsequent user is consuming video content, at least a portion of which was consumed previously by an initial user;
- access one or more reactions by the initial user to the video content that were recorded and synchronized as the initial user consumed the video content, the one or more reactions including at least one live video reaction capturing the initial user;
- determine that one or more of the reactions by the initial user including the live video reaction have an engagement level above a predetermined threshold, the engagement level being subject to individual definition by the initial and subsequent users, allowing the initial user to specify a customized engagement level above which the initial user's reactions are recorded, and allowing the subsequent user to specify a customized engagement level above which the initial user's reactions are presented for viewing; and
- upon determining that the reactions by the initial user have met the customized engagement levels defined by the initial and subsequent users, automatically present the one or more reactions including the live video reaction to the subsequent user synchronously with the video content as the video content is consumed by the subsequent user.

\* \* \* \* \*